US012600208B2

(12) United States Patent
Tichy et al.

(10) Patent No.: US 12,600,208 B2
(45) Date of Patent: *Apr. 14, 2026

(54) OVERMOLDING ASSEMBLY REINFORCEMENT BRACKET

(71) Applicant: Magna Exteriors Inc., Aurora (CA)

(72) Inventors: Stanislav Tichy, Troy, MI (US); Riad Chaaya, Clarkston, MI (US); Mark P. Birka, Northville, MI (US); Christopher J. Kuntze, Goodrich, MI (US); Heiner Salzmann, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,807

(22) Filed: Nov. 19, 2024

(65) Prior Publication Data

US 2025/0115104 A1      Apr. 10, 2025

Related U.S. Application Data

(63) Continuation of application No. 17/620,483, filed as application No. PCT/US2020/038787 on Jun. 19, 2020, now Pat. No. 12,162,335.

(Continued)

(51) Int. Cl.
B60J 5/10           (2006.01)
B29C 45/14          (2006.01)
(Continued)

(52) U.S. Cl.
CPC ......... B60J 5/107 (2013.01); B29C 45/14631 (2013.01); B29K 2705/00 (2013.01);
(Continued)

(58) Field of Classification Search
CPC ..... B60J 5/107; B60J 5/101; B60J 5/10; B60J 5/0472; E05Y 2600/626; E05Y 2900/546
(Continued)

(56)              References Cited

U.S. PATENT DOCUMENTS

| | | |
|---|---|---|
| 8,899,658 B1 | 12/2014 | Gangal et al. |
| 2003/0080632 A1 | 5/2003 | Bauman et al. |

(Continued)

FOREIGN PATENT DOCUMENTS

| | | |
|---|---|---|
| CN | 1051009 A | 5/1991 |
| CN | 105711030 A | 6/2016 |

(Continued)

OTHER PUBLICATIONS

International Search Report of PCT/US2020/038787 mailed Sep. 14, 2020, 1-page.

(Continued)

*Primary Examiner* — Amy R Weisberg
*Assistant Examiner* — Wenwei Zhuo

(57)              ABSTRACT

A liftgate formed with a thermoplastic which is overmolded around preselected reinforcements at stress points, such as a corner area, which includes a pair of separate reinforcement plates and wherein a 3-dimensional reinforcement plate is connected between the pair of separate reinforcements. Preferably the 3-dimensional reinforcement plate is connected to three reinforcements.

16 Claims, 2 Drawing Sheets

Related U.S. Application Data

(60) Provisional application No. 62/864,685, filed on Jun. 21, 2019, provisional application No. 62/864,691, filed on Jun. 21, 2019, provisional application No. 62/864,785, filed on Jun. 21, 2019, provisional application No. 62/864,878, filed on Jun. 21, 2019, provisional application No. 62/864,981, filed on Jun. 21, 2019.

(51) Int. Cl.
  *B29K 705/00* (2006.01)
  *B29L 31/30* (2006.01)

(52) U.S. Cl.
  CPC . *B29L 2031/3014* (2013.01); *E05Y 2201/636* (2013.01); *E05Y 2600/626* (2013.01); *E05Y 2900/546* (2013.01)

(58) Field of Classification Search
  USPC ..... 296/146.8, 146.9, 146.11, 146.6, 106, 56
  See application file for complete search history.

(56) References Cited

U.S. PATENT DOCUMENTS

| | | |
|---|---|---|
| 2007/0145773 A1 | 6/2007 | Saitoh |
| 2010/0032965 A1 | 2/2010 | Kargilis et al. |
| 2011/0061302 A1 | 3/2011 | Barral et al. |
| 2016/0167492 A1 | 6/2016 | Ikeda et al. |
| 2017/0066306 A1 | 3/2017 | Ueno et al. |
| 2017/0361781 A1 | 12/2017 | Khayat et al. |
| 2019/0184798 A1 | 6/2019 | Chiba et al. |
| 2019/0184799 A1 | 6/2019 | Kerschbaum et al. |
| 2020/0009949 A1 | 1/2020 | Tichy et al. |
| 2020/0164929 A1 | 5/2020 | Kuntze et al. |
| 2021/0016723 A1 | 1/2021 | Rajon et al. |
| 2021/0347235 A1 | 11/2021 | Kuntze et al. |
| 2022/0388379 A1 | 12/2022 | Haupt et al. |
| 2024/0075795 A1 | 3/2024 | Zhong et al. |

FOREIGN PATENT DOCUMENTS

| | | | |
|---|---|---|---|
| CN | 110418726 A | | 11/2019 |
| CN | 113417527 A | | 9/2021 |
| CN | 115339297 A | | 11/2022 |
| CN | 220247872 U | * | 12/2023 |
| DE | 102018131893 A1 | | 6/2019 |
| EP | 1927453 A1 | | 6/2008 |
| ES | 2382892 T3 | | 6/2012 |
| FR | 3035035 A1 | | 10/2016 |
| JP | S6146228 U | | 3/1986 |
| JP | 5991395 B1 | | 8/2016 |
| WO | 2009143627 A1 | | 12/2009 |
| WO | 2018150376 A1 | | 8/2018 |

OTHER PUBLICATIONS

Search Report for China Application No. 202080058799.3 dated Jul. 26, 2023, 2-pages.

* cited by examiner

OVERMOLDING ASSEMBLY REINFORCEMENT BRACKET

CROSS-REFERENCE TO RELATED APPLICATIONS

This application is a Continuation of U.S. patent application Ser. No. 17/620,483, filed Dec. 17, 2021, which is a National Stage of PCT International Application No. PCT/US2020/038787, filed Jun. 19, 2020, and claims the benefit of U.S. Provisional Patent Application No. 62/864,685, filed Jun. 21, 2019, U.S. Provisional Patent Application No. 62/864,691, filed Jun. 21, 2019, U.S. Provisional Patent Application No. 62/864,785, filed Jun. 21, 2019, U.S. Provisional Patent Application No. 62/864,878, filed Jun. 21, 2019 and U.S. Provisional Patent Application No. 62/864,981, filed Jun. 21, 2019. The disclosures of the above applications are incorporated herein by reference.

FIELD OF THE INVENTION

The present invention relates to an overmolding assembly reinforcement bracket and a method of improving the rigidity of an overmolded liftgate assembly.

BACKGROUND OF THE INVENTION

Many liftgates in the past have used stamped sheet metal assemblies. This provides a very robust liftgate. However interior finishing is always required typically with some type of upholstered or molded class A interior surface panel. These liftgates are very heavy and require robust hinges and lift assemblies which are costly and complex.

It has been proposed to use liftgates made of strictly polymer materials to save weight and cost. However, such liftgates are sometimes subject to less strength and flexing and therefore are not useful in some applications.

Polymer gates typically require reinforcements in stress areas such as hinge points, tail gate lift support points and latching points. Therefore, steel reinforcements are typically provided at each of these areas to help support the loads imposed on the gates in these areas.

There remains a need in the art to provide a stiffer more robust lightweight overmolded liftgate for an SUV vehicle.

SUMMARY OF THE INVENTION

A liftgate formed with a thermoplastic which is overmolded around preselected reinforcements at stress points, such as a corner area, which includes a pair of separate reinforcement plates and wherein a 3-dimensional reinforcement plate is connected between said pair of separate reinforcements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
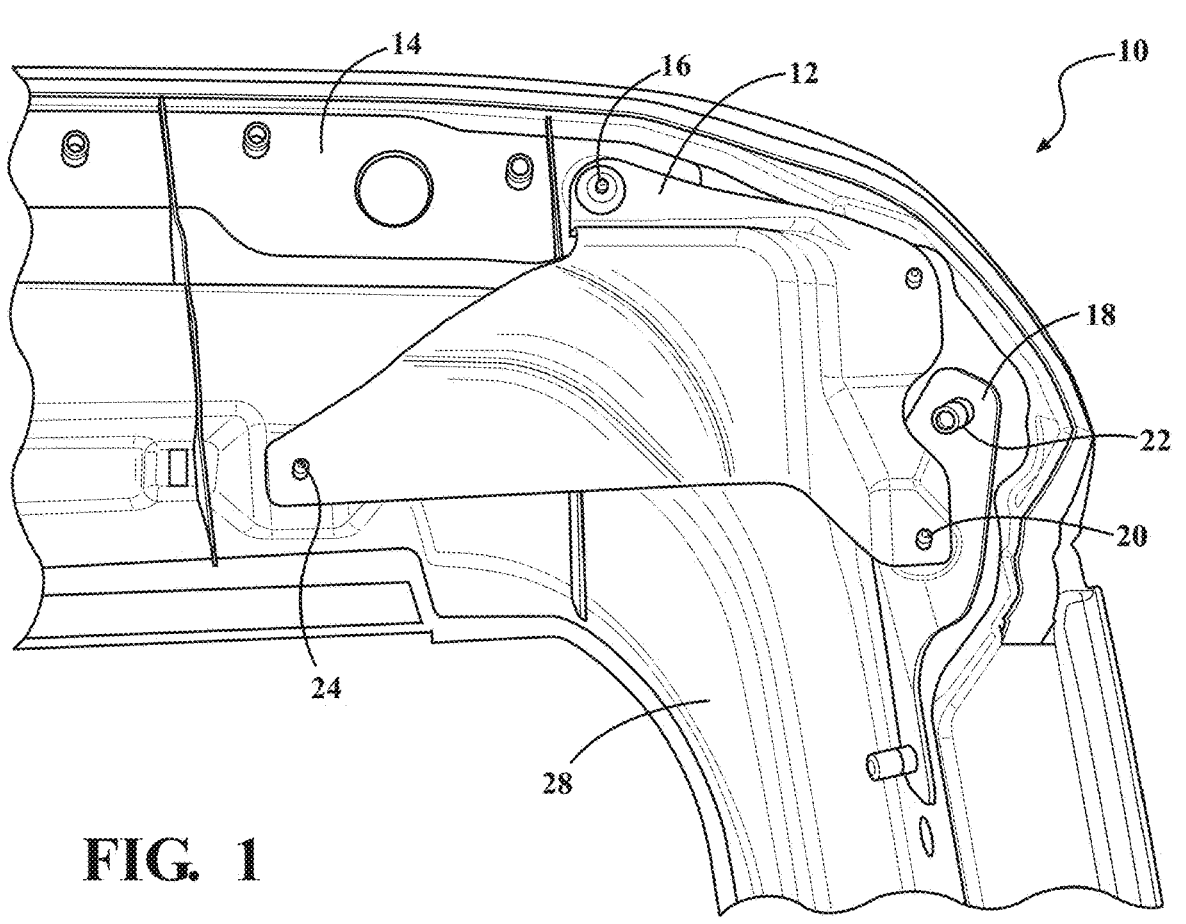
FIG. 1 is a perspective view of an overmold assembly reinforcement of the present invention shown from the inside of a vehicle, in accordance with the present invention.
Figure 2:
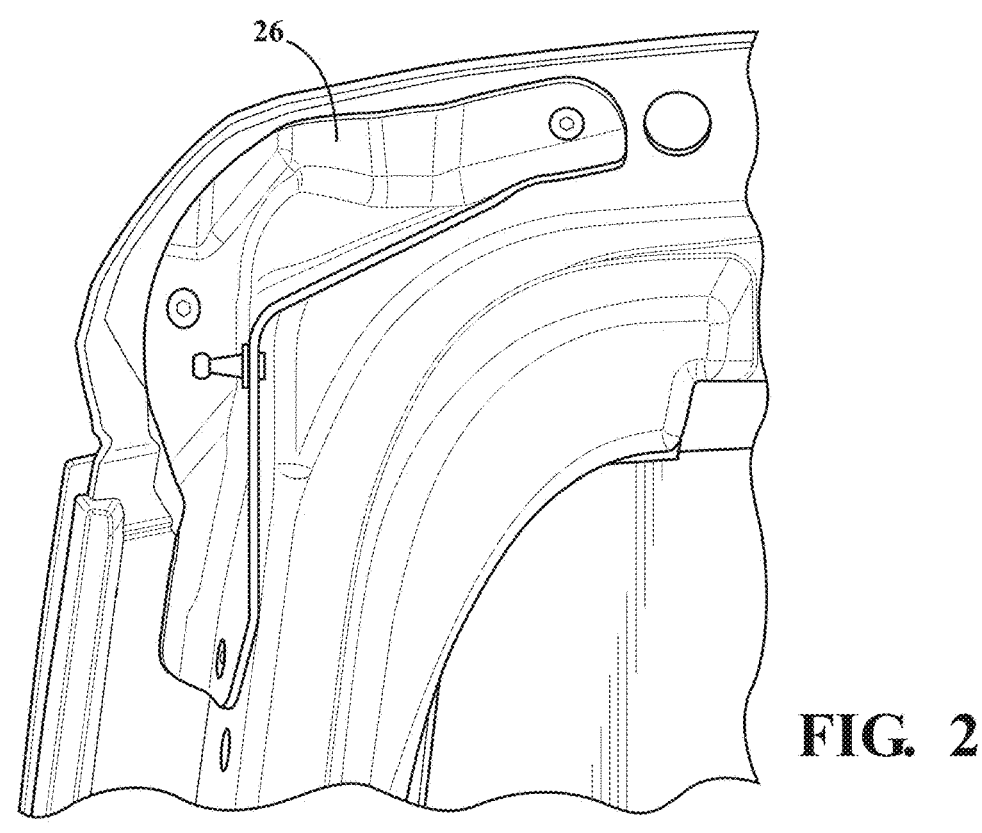
FIG. 2 is an outside view of the area shown in FIG. 1.

Referring to FIGS. 1 and 2 generally, there is provided a reinforcement bracket assembly shown generally at 10 adapted for a liftgate 28 of a vehicle. According to an aspect of the present invention, a 3D assembly reinforcement bracket is provided after overmolding processing.

To gain additional stiffness where three dimensional (3D) overmolding is not possible, or does not provide the required performance, a 3D shaped bracket 12 is assembled after the overmolding process.

The 3D shaped bracket 12 is connected to the hinge reinforcement 14 at and is connected to the ball joint reinforcement 18. To gain the maximum performance a third connection to the overmolded metal bracket is necessary to span a triangular shaped geometry.

Connection points preferably utilize existing connection points for ball joint bracket and hinge bracket mounting.

The 3D shaped bracket 12 is preferably operably connected, e.g., with fasteners, in at least three attachment locations 16 (to the hinge reinforcement 14), 20 (to the ball joint reinforcement 18) and 24 (e.g., to the panel 28 or a reinforcement). The ball joint reinforcement 18 is preferably attached at least attachment location 22 (e.g., to the liftgate panel or a reinforcement). FIG. 2 depicts an outside surface view of the ball joint bracket 26, e.g., metal stamping bracket.

Figures 3, 4:
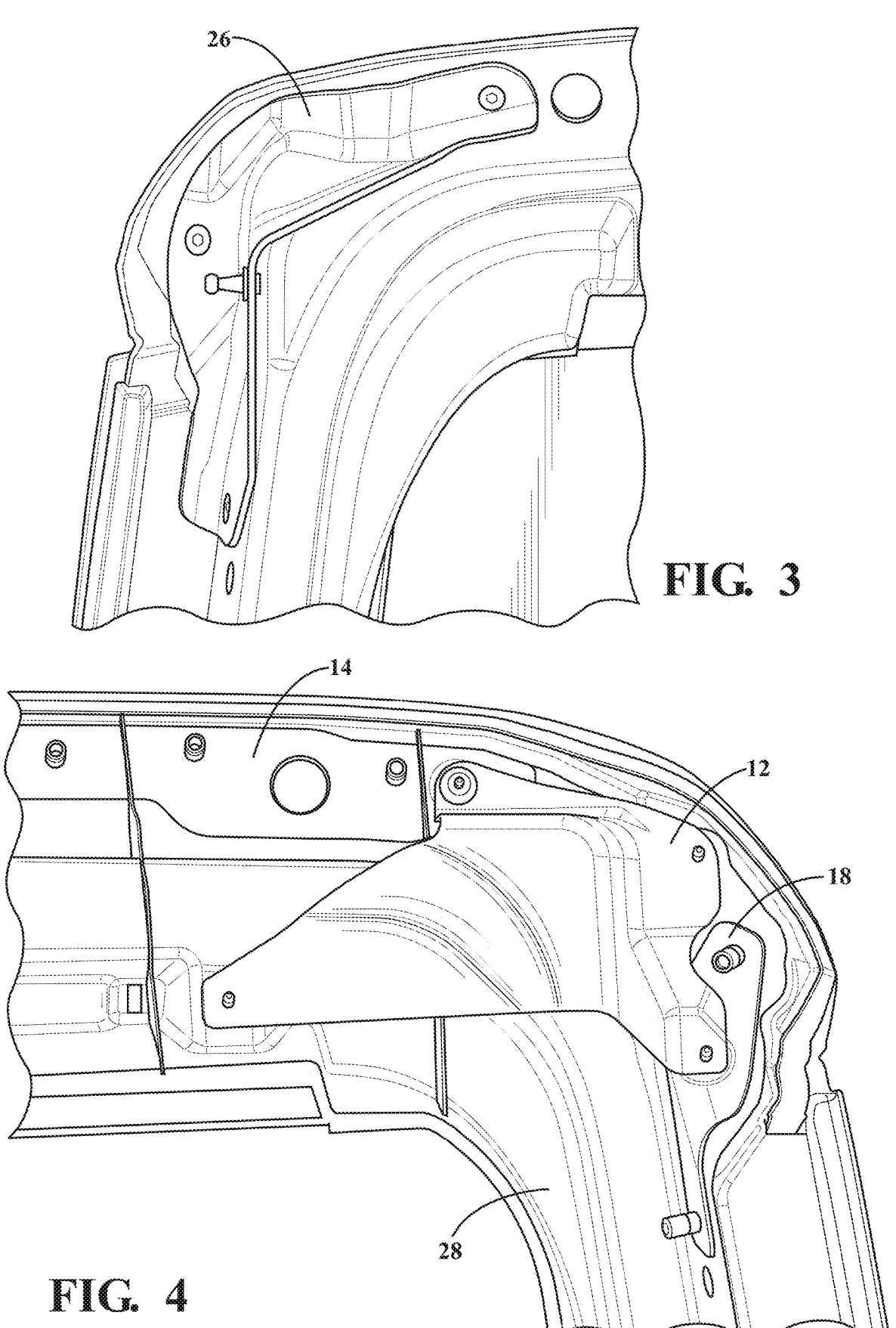
FIG. 3 is a perspective view of a ball joint bracket assembly reinforcement of the present invention shown from the inside of the vehicle, in accordance with an alternate embodiment of the present invention.
FIG. 4 is an outside view of the area of FIG. 3.

In an alternate embodiment of the invention shown generally in FIGS. 3 and 4 the ball joint bracket 26 is extended from standard usage as a ball joint connection bracket to the liftgate 28 into an additional stiffener function. This is done by enlarging the size of the ball joint bracket 26 to connect the hinge reinforcement 14 and the ball joint reinforcement 18 in a 3D shape.

One benefit of this enlarging is additional stiffness of the liftgate in the most critical hinge area.

By adding function to the ball joint bracket, the amount of material and parts can be reduced, resulting in lower weight and cost.

According to aspects of the present invention, there is provided overmolding the steel reinforcements into place for the corners hinge points and cylinder assist mounts.

The reinforcement part is on the inside of a liftgate and includes a ball joint connection for attachment of a gas strut, according to aspects of the present invention.

The 3D reinforcement plate is connected with a third separate overmolded reinforcement plate for providing a triangular reinforcement, in accordance with one preferred aspect of the present invention.

The support portion provides for a hinge plate and a connection of a lifting strut, according to aspects of the present invention.

The 3D reinforcement is attached to the outside of the liftgate, according to aspects of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate for an SUV vehicle comprising:

a liftgate formed with a thermoplastic which is over molded around preselected reinforcements at stress points, which includes at least a pair of separate reinforcement plates and wherein a 3-dimensional reinforcement plate is connected between said pair of separate reinforcement plates, wherein the 3-dimensional reinforcement plate is connected with a third separate overmolded reinforcement plate for providing a triangular reinforcement.

2. The liftgate for an SUV of claim 1, wherein a support spans an overmolded reinforcement area for a hinge plate and a connection of a lifting strut.

3. The liftgate for an SUV of claim 1, where the 3-dimensional reinforcement plate is attached to the outside of the liftgate.

4. The liftgate for an SUV of claim 1, wherein one of the reinforcement plates is on the inside of the liftgate and includes a ball joint connection for attachment of a gas strut.

5. A three-dimensional reinforcement assembly adapted for securing to a liftgate of a sport utility vehicle, comprising:

at least one pair of separate reinforcement plates and wherein a 3-dimensional reinforcement plate is connected between said at least one pair of separate reinforcement plates wherein the reinforcements include a hinge bracket and a ball joint bracket and utilize existing connection points for a hinge bracket mounting and a ball joint bracket mounting.

6. The three-dimensional reinforcement assembly of claim 5, wherein a support spans an overmolded reinforcement area for a hinge plate and a connection of a lifting strut.

7. The three-dimensional reinforcement assembly of claim 5, wherein the 3-dimensional reinforcement plate is attached to the outside of a liftgate.

8. The three-dimensional reinforcement assembly of claim 5, wherein one of the reinforcements is on the inside of a liftgate and includes a ball joint connection for attachment of a gas strut.

9. The three-dimensional reinforcement assembly of claim 5, wherein the 3-dimensional reinforcement plate is connected with a third separate overmolded reinforcement plate for providing a triangular reinforcement.

10. The three-dimensional reinforcement assembly of claim 5, wherein one of the reinforcements is a 3D shaped bracket assembled after an overmolding process.

11. The three-dimensional reinforcement assembly of claim 5, wherein one of the reinforcements is a bracket connected to another of the reinforcements that is a hinge reinforcement.

12. The three-dimensional reinforcement assembly of claim 5, wherein one of the reinforcements is a bracket connected to another of the reinforcements that is a ball joint reinforcement.

13. The three-dimensional reinforcement assembly of claim 5, wherein the reinforcements comprise a 3D bracket connected to a hinge reinforcement and a ball joint reinforcement.

14. The three-dimensional reinforcement assembly of claim 5, further comprising an enlarged ball joint bracket that is a ball joint connection and a stiffener connecting the reinforcements that are a hinge reinforcement and a ball joint reinforcement in a 3D shape geometry.

15. The three-dimensional reinforcement assembly of claim 5, wherein the reinforcements are connected to an enlarged ball joint bracket.

16. The three-dimensional reinforcement assembly of claim 5, further comprising a ball joint connection bracket that is enlarged in a hinge area for additional stiffness of the liftgate.

* * * * *